(12) United States Patent
Yang et al.

(10) Patent No.: US 7,623,459 B2
(45) Date of Patent: Nov. 24, 2009

(54) METHODS AND APPARATUS FOR PROVIDING A FLOW CONTROL SYSTEM FOR TRAFFIC FLOW IN A WIRELESS MESH NETWORK BASED ON TRAFFIC PRIORITIZATION

(75) Inventors: Liuyang Lily Yang, Portland, OR (US); Bahareh Sadeghi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 467 days.

(21) Appl. No.: 11/292,773

(22) Filed: Dec. 2, 2005

(65) Prior Publication Data

US 2007/0127378 A1 Jun. 7, 2007

(51) Int. Cl.
 *H04L 1/00* (2006.01)
 *H04L 12/26* (2006.01)
(52) U.S. Cl. .................. 370/235; 370/229; 370/230; 370/230.1; 370/231; 370/236
(58) Field of Classification Search ............ 370/230, 370/230.1, 231, 237, 229
 See application file for complete search history.

(56) References Cited

U.S. PATENT DOCUMENTS

| 7,385,920 | B2* | 6/2008 | Zhang et al. | 370/229 |
|---|---|---|---|---|
| 2004/0179475 | A1* | 9/2004 | Hwang et al. | 370/229 |
| 2005/0053034 | A1 | 3/2005 | Chiuch | |
| 2005/0122900 | A1* | 6/2005 | Tuulos et al. | 370/229 |
| 2005/0122902 | A1* | 6/2005 | Guo et al. | 370/229 |
| 2005/0135243 | A1 | 6/2005 | Lee et al. | |
| 2005/0152373 | A1* | 7/2005 | Ali | 370/395.4 |
| 2005/0243717 | A1* | 11/2005 | Stieglitz et al. | 370/229 |
| 2005/0249114 | A1* | 11/2005 | Mangin et al. | 370/229 |
| 2006/0146875 | A1 | 7/2006 | Yang | |
| 2006/0198301 | A1* | 9/2006 | Airy et al. | 370/229 |
| 2007/0076610 | A1 | 4/2007 | Yang | |

FOREIGN PATENT DOCUMENTS

WO  WO01/45328 A1  6/2001

OTHER PUBLICATIONS

Ramakrishnan, "The Adition of Explicit COngestion Notification (ECN) to IP", Sep. 2001, IETF, all pages.*
Yi, Yung et al. "Hop by Hop Congestion Control Over a Wireless Multi-hop Network", Mar. 2004, IEEE, all pages.*
(NTT DOCOMO/INTEL) Yang, L. Liulang, Yamada, Akira "802.11 TGs Simple Efficient Extensible Mesh (SEE-Mesh) Proposal" Jun. 2005, IEEE, all pages.*
(NTT DOCOMO/INTEL) Yang, L. Liuyang, Yamada, Akira, "MAC Considerations for Mesh", Jul. 2004, IEEE, all pages.*
(NTT DOCOMO/INTEL) Yang, L. Liuyang, Yamada, Akira et al. "Simulation Results for SEEMesh Congestion Control Protocol", Jun. 10, 2005, IEEE, all pages.*

(Continued)

*Primary Examiner*—Kwang B Yao
*Assistant Examiner*—Adam Duda
(74) *Attorney, Agent, or Firm*—Schwabe, Williamson & Wyatt, P.C.

(57) ABSTRACT

Embodiments of methods and apparatus for providing a flow control system for traffic flow in a wireless mesh network based on traffic prioritization are generally described herein. Other embodiments may be described and claimed.

24 Claims, 4 Drawing Sheets

```
400
    for (i=0; i<=3; i++) { // AC[0..3] maps to [VO, VI, BE, BK]
        monitor local AC[i] queue condition (queue length,      } 410
            received/transmission rates, etc.);
        if (detect congestion for this AC) {
            for (j=i; j<=3; j++) { // congestion signaling for this AC and   } 420
                all others with lower priority
                if (AC[j] has active flow at this node) }
                    identify the previous hop neighbors for flows in AC[j]; } 430
                    send "Congestion Notification" to all these neighbors; } 440
                }
            }
        } else if (congestion condition is removed for this AC) {
            for (j=0; j<=i; j++) { // congestion signaling for this AC and   } 450
                all others with higher priority
                if (AC[j] has active flow at this node) {
                    identify the previous hop neighbors for flows in AC[j]; } 460
                    send "Improvement Notification" to all these neighbors; } 470
                }
            }
        }
    }
```

OTHER PUBLICATIONS (NTT DOCOMO/INTEL) Yang, L. Liuyang, Yamada, Akira, et al. "EDCA Based Congestion Control for WLAN Mesh Networks", 2006, IEEE, all pages.*

(NTT DOCOMO) Yamada, Akira, et al. "EDCA Based Congestion Control Method for WLAN Mesh Networks", Jul. 2005, IEICE Tech. Rep. vol. 105 No. 196.*

(NTT DOCOMO) Yamada, Akira, et al. "A Prospective Mesh Network Based Platform for Universal Mobile Communication Services", 2004, Proceedings of the IEICE General Conference.*

(NTT DOCOMO) Yamada, Akira et al. "IEEE 802.11s Wireless LAN Mesh Network Technology", Sep. 2006, NTT DOCOMO, all pages.*

Sadeghi, Bahareh "Congestion Control in Wireless Mesh Networks", 2009, Springer-Verlag London, all pages.*

Holland, Gavin, "A Rate Adaptive MAC Protocol for Multi-Hop Wireless Networks", Jul. 2001, ACM, all pages.*

Mishra, Partho et al "A Hop by Hop Rate-based Congestion Control Scheme", 1992, ACM, all pages.*

Hull, Bret et al "Mitigating Congestion in Wireless Sensor Networks", 2004, ACM, all pages.*

Fujiwara, "EDCA Parameter Optimization for Layer 2 MESH Network Throughput Improvement", Jul. 2005, IEICE, all pages.*

International Search Report established for PCT/US2006/046157, 4 pages.

* cited by examiner

```
400 for (i=0; i<=3; i++) { // AC[0..3] maps to [VO, VI, BE, BK]
        monitor local AC[i] queue condition (queue length,  } 410
            received/transmission rates, etc.);
        if (detect congestion for this AC) }
            for (j=i; j<=3; j++) { // congestion signaling for this AC and   } 420
                all others with lower priority
                if (AC[j] has active flow at this node) }
                    identify the previous hop neighbors for flows in AC[j];   } 430
                    send "Congestion Notification" to all these neighbors;   } 440
                }
            }
        } else if (congestion condition is removed for this AC) {
            for (j=0; j<=i; j++) { // congestion signaling for this AC and   } 450
                all others with higher priority
                if (AC[j] has active flow at this node) }
                    identify the previous hop neighbors for flows in AC[j];   } 460
                    send "Improvement Notification" to all these neighbors;   } 470
                }
            }
        }
}
```

METHODS AND APPARATUS FOR PROVIDING A FLOW CONTROL SYSTEM FOR TRAFFIC FLOW IN A WIRELESS MESH NETWORK BASED ON TRAFFIC PRIORITIZATION

TECHNICAL FIELD

The present disclosure relates generally to wireless communication systems, and more particularly, to methods and apparatus for providing a flow control system for traffic flow in a wireless mesh network based on traffic prioritization.

BACKGROUND

As wireless communication becomes more and more popular at offices, homes, schools, etc., the demand for resources may cause network congestions and slowdowns. To reduce performance degradations and/or overload conditions, a wireless mesh network may be implemented in a wireless communication system. In particular, a wireless mesh network may include two or more nodes. If one node fails to operate properly, the remaining nodes of a wireless mesh network may still be able to communicate with each other either directly or through one or more intermediate nodes. Accordingly, a wireless mesh network may provide multiple paths for a transmission to propagate from the source to the destination. Thus, a wireless mesh network may be a reliable solution to support the increasing demand for wireless communication services.

DETAILED DESCRIPTION

In general, methods and apparatus for providing a flow control system for traffic flow in a wireless mesh network based on traffic prioritization are described herein. The methods and apparatus described herein are not limited in this regard.

Figure 1:
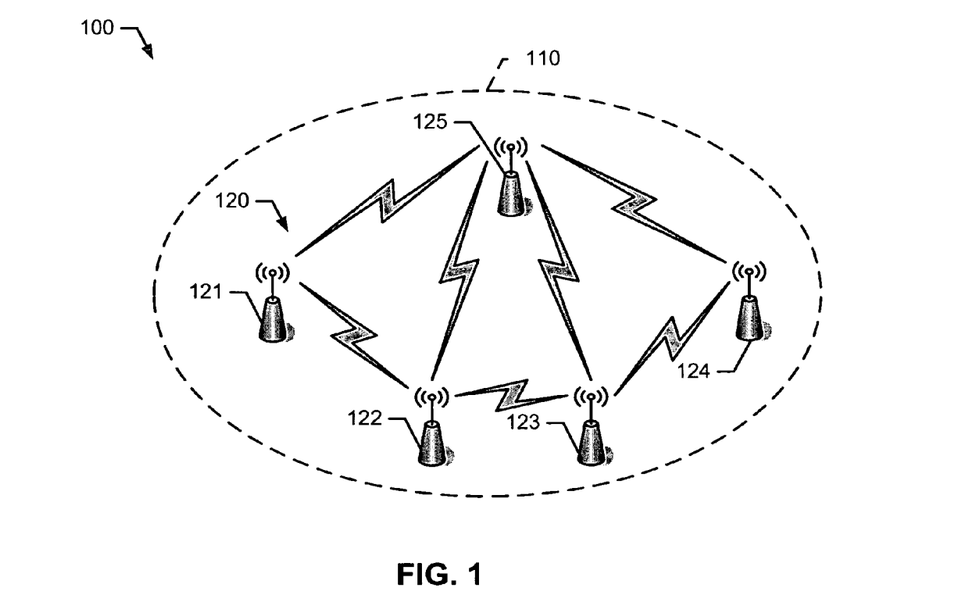
FIG. 1 is a schematic diagram representation of an example wireless communication system according to an embodiment of the methods and apparatus disclosed herein.

Referring to FIG. 1, an example wireless communication system 100 including a wireless mesh network 110 is described herein. In one example, the wireless mesh network 110 may be an extended service set (ESS) mesh network based on developments by the Institute of Electrical and Electronic Engineers (IEEE). The wireless mesh network 110 may include a plurality of mesh nodes 120, generally shown as 121, 122, 123, 124, and 125. Although FIG. 1 depicts five communication nodes, the wireless mesh network 110 may include additional or fewer mesh nodes.

As described in detail below, the plurality of mesh nodes 120 may include access points, redistribution points, end points, and/or other suitable connection points for traffic flows via mesh paths having multiple hops. One or more of the plurality of mesh nodes 120 may also be operatively coupled to a common public or private network (not shown) such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc. Further, one or more of the plurality of mesh nodes 120 may be operatively coupled to a wireless personal area network (WPAN), a wireless local area network (WLAN), a wireless metropolitan area network (WMAN), a wireless wide area network (WWAN), and/or other suitable wireless communication networks.

The plurality of mesh nodes 120 may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, multi-carrier modulation (MDM), and/or other suitable modulation techniques to communicate via wireless links. In one example, one or more of the plurality of mesh nodes 120 may implement OFDM modulation to transmit large amounts of digital data by splitting a radio frequency signal into multiple small sub-signals, which in turn, are transmitted simultaneously at different frequencies. In particular, the plurality of mesh nodes 120 may use OFDM modulation as described in the 802.xx family of standards developed by the Institute of Electrical and Electronic Engineers (IEEE) and/or variations and evolutions of these standards (e.g., 802.11x, 802.15, 802.16x, etc.) to communicate via wireless links. For example, the plurality of mesh nodes 120 may operate in accordance with the 802.16 family of standards developed by IEEE to provide for fixed, portable, and/or mobile broadband wireless access (BWA) networks.

The plurality of mesh nodes 120 may also use direct sequence spread spectrum (DSSS) modulation (e.g., the IEEE std. 802.11b) and/or frequency hopping spread spectrum (FHSS) modulation (e.g., the IEEE std. 802.11). Although the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, the plurality of mesh nodes 120 may also operate in accordance with other suitable wireless communication protocols that require very low power such as Bluetooth®, Ultra Wideband (UWB), and/or radio frequency identification (RFID) to communicate via wireless links.

In addition or alternatively, one or more of the plurality of mesh nodes 120 may communicate via a wired link (not shown). For example, one or more of the plurality of mesh nodes 120 may use a serial interface, a parallel interface, a small computer system interface (SCSI), an Ethernet interface, a universal serial bus (USB) interface, a high performance serial bus interface (e.g., IEEE 1394 interface), and/or any other suitable type of wired interface to communicate.

In addition to the wireless mesh network 110, the wireless communication system 100 may include other communication networks. In one example, the wireless communication system 100 may include a basic service set (BSS) network (not shown). One or more of the plurality of mesh nodes 120 may communicate with an access point (AP) associated with the BSS network. The BSS network may include one or more subscriber stations. For example, a subscriber station associated with the BSS network may be a wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. In another example, one or more of the plurality of mesh nodes 120 may operate as an AP associated with the BSS network (e.g., a mesh AP). Thus, the mesh AP may be a part of the wireless mesh network 110 and the BSS network.

The wireless communication system 100 may also include one or more radio access networks (RANs) such as a cellular radio network (not shown). The RAN may include one or more base stations, and other radio components necessary to provide wireless communication services. The base stations may operate in accordance with the applicable standard(s) for providing wireless communication services. That is, the base stations of the RAN may be configured to operate in accordance with one or more of several wireless communication protocols. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, High-Speed Downlink Packet Access (HSDPA) technology, High-Speed Uplink Packet Access (HSUPA) technology, other suitable generation of wireless access technologies (e.g., 3G, 4G, etc.) standards based on these technologies, variations and evolutions of these standards, and/or other suitable wireless communication standards.

Further, the wireless communication system 100 may include other wireless personal area network (WPAN) devices, wireless local area network (WLAN) devices, wireless metropolitan area network (WMAN) devices, and/or wireless wide area network (WWAN) devices such as network interface devices and peripherals (e.g., network interface cards (NICs)), access points (APs), gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system (not shown). Accordingly, the wireless communication system 100 may be implemented to provide WPANs, WLANs, WMANs, WWANs, and/or other suitable wireless communication networks. Although certain examples have been described above, the scope of coverage of this disclosure is not limited thereto.

In general, a node of a network (e.g., a wireless mesh network 110 of FIG. 1) may continue to insert packets into the network but at least some of the packets may be dropped because of traffic congestion at one or more nodes (e.g., a bottleneck). Alternatively, network resources may not be fully utilized as a node may have been operating at a slower transmission rate in response to traffic congestion. By monitoring traffic flow as described herein, a flow control system (e.g., the flow control system 200 of FIG. 2) may adjust transmission rate of data of one or more nodes within a network to ensure that the data reaches its destination and to optimize the use of network resources. As described in further detail below, the flow control system may maintain relative priority between traffic flows of different ACs so that a traffic flow of an AC with a relatively higher priority may have a higher probability of accessing network resources to traverse through the network (e.g., traverse from a source node to a destination node).

Figure 2:
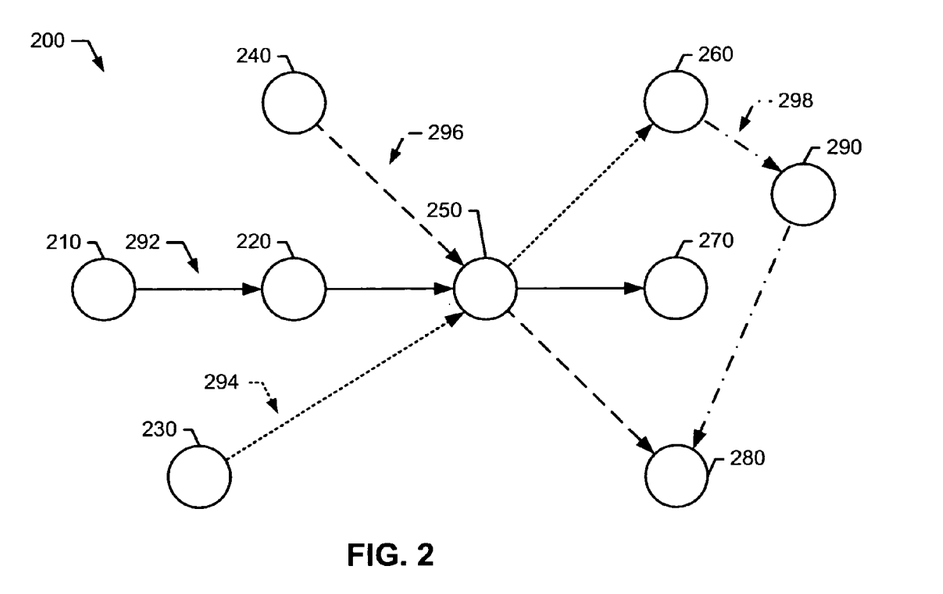
FIG. 2 depicts an example flow control system.

In the example of FIG. 2, a flow control system 200 may include a plurality of communication nodes, generally shown as 210, 220, 230, 240, 250, 260, 270, 280, and 290. For example, the flow control system 200 may be implemented in a wireless mesh network (e.g., the wireless mesh network 110 of FIG. 1) and/or other suitable communication networks. Accordingly, the plurality of nodes 210, 220, 230, 240, 250, 260, 270, 280, and 290 may be mesh nodes. Although FIG. 2 depicts nine nodes, the flow control system 200 may include additional or fewer nodes.

Two or more nodes may communicate with each other to route information across the control flow system 200 from a source node to a destination node. In one example, the node 210 may be a source node and the node 270 may be a destination node of a traffic flow 292 (shown as solid arrows). The traffic flow 292 may begin at the node 210 and traverse through the nodes 220 and 250 to reach the node 270. In another example, the node 230 may be a source node and the node 260 may be a destination of a traffic flow 294 (shown as dotted arrows). The traffic flow 294 may begin at the node 230 and traverse through the node 250 to reach the node 260. In yet another example, the node 240 may be a source node and the node 280 may be a destination node of a traffic flow 296 (shown as dashed arrows). The traffic flow 296 may begin at the node 240 and traverse through the node 250 to reach the node 280. In further yet another example, the node 260 may be a source node and the node 280 may be a destination of a traffic flow 298 (shown as alternating dashed and dotted arrows). The traffic flow 298 may begin at the node 260 and traverse through the node 290 to reach to the node 280. Although FIG. 2 depicts four traffic flows, the flow control system 200 may include additional or fewer traffic flows.

The traffic flows 292, 294, 296, and 298 may include a variety of data (e.g., packets). Based on the type of data, each of the traffic flows 292, 294, 296, and 298 may be categorized into an access category (AC). In one example, each of the traffic flows 292, 294, 296, and 298 may be categorized in accordance with the 802.11 family of standards developed by IEEE (e.g., the to-be-published IEEE std. 802.11(e), approved in July 2005). Based on one or more enhanced distributed channel access (EDCA) parameters (e.g., arbitration inter-frame spacing number (AIFSN), minimum contention window (CWmin), maximum contention window (CWmax), transmission opportunity (TXOP), etc.), the ACs may be prioritized so that higher priority traffic may have higher probability of accessing a communication resource within the control flow system 200 such as a wireless channel or a communication node to traverse from the source node to the destination node. In a descending order of priority (e.g., highest to lowest), for example, an AC may be voice data traffic, video data traffic, best effort data traffic, or background data traffic. Based on the example order of ACs, the AIFSN of video data traffic may be relatively smaller than the AIFSNs of best effort data traffic and background data traffic because video data traffic may have relatively higher priority than best effort data traffic and background data traffic. The AIFSN of video data traffic may be relatively larger than the AIFSN of voice data traffic because video data traffic may have relatively lower priority than voice data traffic. Although some priority characteristics are described in the above examples, other suitable EDCA parameters or priority characteristics may be used to implement the methods and apparatus described herein.

In one example, the traffic flow 292 may be categorized as best effort data traffic, the traffic flow 294 may be categorized as video data traffic, the traffic flow 296 may be categorized as voice data traffic, and the traffic flow 298 may be categorized as background data traffic. Based on an order of priority developed by IEEE, for example, the AC of the traffic flow 296 may have a higher priority than the AC of the traffic flow 294, which in turn, may have higher priority than the AC of the traffic flow 292. The AC of the traffic flow 292 may have a higher priority than the AC of the traffic flow 298, which may have the lowest priority relative to the ACs of the traffic flows 292, 294, and 296. The methods and apparatus described herein are not limited in this regard.

Although the above examples describe categorizing traffic into particular ACs, the methods and apparatus disclosed herein are readily applicable to categorize traffic into other suitable ACs. In addition, while the above examples depict a particular order of priority of the ACs, the methods and apparatus described herein may prioritize the ACs in a different order.

Figure 3:
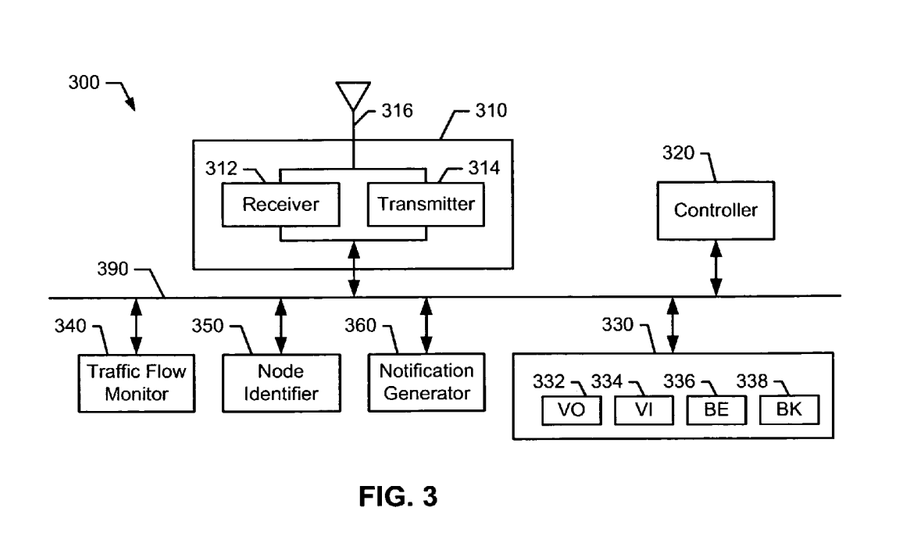
FIG. 3 is a block diagram representation of an example communication node associated with the example flow control system of FIG. 2.

Turning to FIG. 3, for example, a communication node 300 (e.g., any one of the communication nodes of FIG. 2) may include a communication interface 310, a controller 320, a memory 330, a traffic flow monitor 340, a node identifier 350, and a notification generator 360. The communication interface 310, the controller 320, the memory 330, the traffic flow monitor 340, the node identifier 350, and/or the notification generator 360 may be operatively coupled to each other via a bus 390. Although FIG. 3 depicts components of the communication node 300 coupling to each other via the bus 390, these components may be operatively coupled to each other via other suitable direct or indirect connections (e.g., a point-to-point connection or a point-to-multiple point connection).

The communication interface 310 may include a receiver 312, a transmitter 314, and an antenna 316. The communication 300 may receive and/or transmit data via the receiver 312 and the transmitter 314, respectively. The antenna 316 may include one or more directional or omni-directional antennas such as dipole antennas, monopole antennas, patch antennas, loop antennas, microstrip antennas, and/or other types of antennas suitable for transmission of radio frequency (RF) signals. Although FIG. 3 depicts a single antenna, the communication node 300 may include additional antennas. For example, the communication node 300 may include a plurality of antennas to implement a multiple-input-multiple-output (MIMO) system.

Briefly, the controller 320 may categorize incoming traffic at the communication node 300 into a plurality of ACs. For example, the plurality of ACs may include voice data traffic, video data traffic, best effort data traffic, background data traffic, and/or other suitable ACs. Accordingly, the controller 320 may store incoming traffic in corresponding AC queues at the memory 330. In particular, the memory 330 may include one or more AC queues with each AC queue corresponding to one of the plurality of ACs mentioned above. For example, the memory 330 may include an AC queue for voice data traffic (VO) 332, an AC queue for video data traffic (VI) 334, an AC queue for best effort data traffic (BE) 336, and an AC queue for background data traffic (BK) 338. Although FIG. 3 depicts four AC queues within the memory 330, the methods and apparatus described herein may include additional or fewer AC queues.

As described in detail below, the traffic flow monitor 340 may monitor traffic flow at the communication node 300. The traffic flow monitor 340 may detect a condition indicative of traffic congestion at the communication node 300 (e.g., a congestion condition). In particular, the traffic flow monitor 340 may monitor for a queue condition associated with an AC queue (e.g., length of the AC queue, communication rate of the AC queue, and/or other suitable characteristics) to detect the congestion condition. In one example, the traffic flow monitor 340 may detect a congestion condition if the length of an AC queue exceeds a threshold value or if the reception rate of the AC queue is greater than a threshold rate, which may cause the AC queue to overload. For example, the threshold rate may be a predefined rate, a dynamically adjusted rate, or a rate based on a transmission rate of the AC queue (e.g., an outgoing rate). Also, the traffic flow monitor 340 may detect a condition indicative of traffic improvement at the communication node 300 (e.g., an improvement condition). In one example, the traffic flow monitor 340 may detect an improvement condition if the length of an AC queue is less than a minimum threshold value or if the transmission rate is less than a minimum threshold rate, which may cause the AC queue to be under-utilized. For example, the minimum threshold rate may be a predefined rate or a dynamically adjusted rate based on measured traffic and/or available capacity.

The node identifier 350 may identify one or more neighboring nodes of the communication node 300 to receive a notification associated with a traffic flow condition at the communication node 300 from the communication node 300 (e.g., a notification recipient node). As described in detail below, the notification recipient node may be a contributory node, a peer node, a lower priority-AC node, a higher priority-AC node, or a bystander node relative to the communication node 300. In particular, a contributory node may be a neighboring node relatively upstream to the communication node 300 that may be causing and/or contributing to the traffic flow condition (e.g., the node 230 relative to the node 250 of FIG. 2). For example, the contributory node may be a neighboring node transmitting data of an overloaded AC, which may be an AC corresponding to an AC queue at the communication node 300 with a length exceeding a threshold value. The peer node may be a neighboring node transmitting data of an AC with a priority equal to the priority of the overloaded AC. The lower priority-AC node may be a neighboring node transmitting data of an AC with a priority relatively lower than the priority of the overloaded AC (e.g., the node 220 relative to the node 250 of FIG. 2). The higher-priority node may be a neighboring node transmitting data of an AC with a priority relatively higher than the priority of the overloaded AC (e.g., the node 240 relative to the node 250 of FIG. 2). The bystander node may be a neighboring node affected by the traffic flow condition at the communication node 300 because the neighboring node may be located within a relatively close proximity of the communication node 300 but the neighboring node may not be transmitting data that traverses through the communication node 300 (e.g., the node 290 relative to the node 250 of FIG. 2).

The notification generator 360 may generate the notification to indicate a congestion condition (e.g., a congestion notification) or an improvement condition (e.g., an improvement notification). As described in detail below, the congestion notification may instruct a notification recipient node of the communication node 300 to reduce the transmission rate of data of a particular AC at which the data may traverse through the communication node 300. In contrast, the improvement notification may instruct a notification recipient node to increase the transmission rate of data of a particular AC at which the data may traverse through the communication node 300. Accordingly, the communication interface 310 (e.g., via the transmitter 314) may transmit the notification to the notification recipient node(s) identified by the node identifier 350.

While the components shown in FIG. 3 are depicted as separate blocks within the communication node 300, the functions performed by some of these blocks may be integrated within a single semiconductor circuit or may be implemented using two or more separate integrated circuits. For example, although the receiver 312 and the transmitter 314 are depicted as separate blocks within the communication interface 310, the receiver 312 may be integrated into the transmitter 314 (e.g., a transceiver). In another example, although the controller 320, the traffic flow monitor 340, the node identifier 350, and the notification generator 360 are depicted as separate blocks, the controller 320, the traffic flow monitor 340, the node identifier 350, and/or the notification generator 360 may be integrated into a single component. The methods and apparatus described herein are not limited in this regard.

Referring back to FIG. 2, for example, the node 250 may be a common node among the traffic flows 292, 294, and 296. In one example, the node 250 may receive best effort data traffic from the nodes 210 and 220 via the traffic flow 292, video data traffic from the node 230 via the traffic flow 294, and voice data traffic from the node 260 via the traffic flow 296. The node 250 (e.g., via the controller 320 of FIG. 3) may categorize and store traffic of each AC in a corresponding AC queue of a local memory (e.g., the AC queues 332, 334, 336, and 338 of FIG. 3).

To optimize the use of network resources, the node 250 (e.g., via the traffic flow monitor 340 of FIG. 3) may monitor each AC queue (e.g., the AC queues 332, 334, 336, and 338). If the node 250 detects congestion of a particular AC queue, the node 250 (e.g., via the node identifier 350 of FIG. 3) may identify one or more neighboring nodes to notify of the local congestion condition at the node 250 (e.g., notification recipient node(s)). In one example, the node 250 may identify one or more upstream neighboring nodes associated with traffic flows of an overloaded AC (e.g., an AC corresponding to an AC queue at the node 250 with a length exceeding a threshold value). The node 250 may also identify one or more upstream neighboring nodes associated with traffic flows of an AC with a priority relatively lower than the priority of the overloaded AC. Accordingly, the node 250 (e.g., via the notification generator 360 of FIG. 3) may generate and transmit a congestion notification to the notification recipient node(s). In particular, the congestion notification may instruct the notification recipient node(s) to reduce the transmission rate of a traffic flow to the node 250.

In one example, the node 250 may detect an overload at the AC queue for video data traffic (e.g., via the traffic flow 294). For example, the node 250 may detect that the length of the VI queue (e.g., the VI queue 334 of FIG. 3) exceeded a threshold value. Accordingly, the node 250 may generate and transmit a congestion notification to the node 230 (e.g., a contributory node) because as noted above, the node 250 may receive video data traffic from the node 230 via the traffic flow 294. The congestion notification may indicate the congestion condition at the node 250 to the node 230, which in turn, may automatically reduce the traffic transmission rate of the traffic flow 294. Alternatively, the congestion notification may instruct the node 230 to reduce the transmission rate of the traffic flow 294. The node 250 may also transmit the congestion notification to other nodes transmitting data of ACs with a priority relatively lower than or equal to the priority of video data traffic such as best effort data traffic and background data traffic. Although the lengths of the BE queue and/or the BK queue (e.g., the BE queue 336 and BK queue 338, respectively) may not exceed corresponding threshold values, the node 250 may also transmit the congestion notification to upstream nodes associated with best effort data traffic and/or background data traffic to maintain priority among the traffic flows 292, 294, and 296. Thus, the node 250 may also transmit the congestion notification to the nodes 210 and 220 (e.g., a lower-AC priority node) because the node 250 may receive best effort data traffic from the nodes 210 and 220 via the traffic flow 292. Without maintaining priority among the traffic flows 292, 294, and 296 as described herein, a relatively lower-priority traffic flow may use/occupy more network resources than a relatively higher-priority traffic flow. The node 250, however, may not transmit the congestion notification to the node 240 (e.g., a higher-priority AC node) because the node 240 is a source of a traffic category (e.g., voice data traffic) with a priority relatively higher than the priority of video data traffic.

In another example, the node 250 may detect an overload at the AC queue for voice data traffic (e.g., via the traffic flow 296). For example, the node 250 may detect that the length of the VO queue (e.g., the VO queue 332 of FIG. 3) may exceed a threshold value. Accordingly, the node 250 may generate and transmit a congestion notification to the node 240 (e.g., a contributory node) because the node 250 may receive voice data traffic from the node 240 via the traffic flow 296. The node 250 may also transmit the congestion notification to source(s) of traffic categories with a priority relatively lower than the priority of voice data traffic such as video data traffic, best effort data traffic, and background data traffic. Although the lengths of the VI queue, the BE queue and/or the BK queue (e.g., the VI queue 334, the BE queue 336 and BK queue 338, respectively) may not exceed corresponding threshold values, the node 250 may also transmit the congestion notification to upstream nodes associated with video data traffic, best effort data traffic and/or background data traffic to maintain priority among the traffic flows 292, 294, and 296. Thus, the node 250 may transmit the congestion notification to the nodes 210, 220, and 230 (e.g., lower-priority AC nodes) because the node 250 may receive best effort data traffic from the nodes 210 and 220 via the traffic flow 292 and video data traffic from the node 230 via the traffic flow 294.

In yet another example, the node 250 may detect an overload at the AC queue for best effort data traffic (e.g., via the traffic flow 292). For example, the node 250 may detect that the length of the BE queue (e.g., the BE queue 335 of FIG. 3) may exceed a threshold value. Accordingly, the node 250 may generate and transmit a congestion notification to the nodes 210 and 220 (e.g., a contributory node) because the node 250 may receive best effort data traffic from the nodes 210 and 220 via the traffic flow 292. The node 250 may not transmit the congestion notification to the nodes 230 and 240 (e.g., higher-priority AC nodes) because the nodes 230 and 240 are sources of video data traffic and voice data traffic, respectively, which have priorities relatively higher than the priority of best effort data traffic from the node 220.

Although the node 250 may not be a common node of a traffic flow, the node 250 may also transmit the congestion notification to a neighboring node of the traffic flow because that neighboring node may be affected by the congestion condition at the node 250 (e.g., a bystander node). As noted above, a bystander node may be located within a relatively close proximity of the node 250 and transmit data of an AC with a priority relatively lower than the priority of the overloaded AC. In one example, the node 250 may detect an overload at the AC queue for best effort data traffic (e.g., via the traffic flow 292), and the traffic flow 298 may be background data traffic. To maintain priority among the traffic flows 292, 294, 296, and 298, the node 250 may also transmit the congestion notification to nodes associated with the traffic flow 298 even though the traffic flow 298 does not traverse through the node 250. Accordingly, the node 250 may transmit a congestion notification to the nodes 260 and 290 because the nodes 260 and 290 are sources of background data traffic, which has a priority relatively lower than the priority of best effort data traffic. The methods and apparatus described herein are not limited in this regard.

Figure 4:
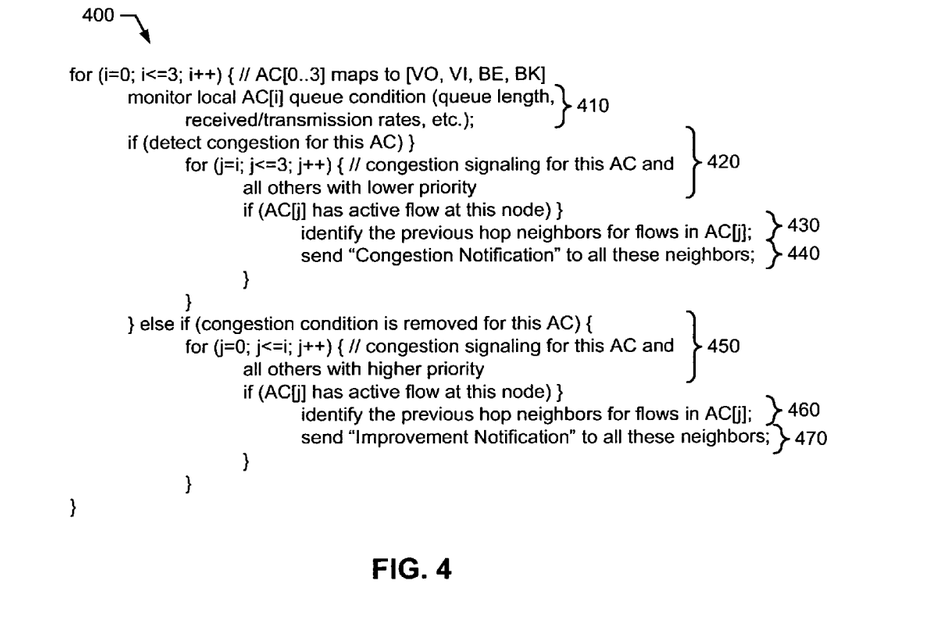
FIG. 4 depicts a high-level language example of code that may be used to implement the example flow control system of FIG. 2.

Referring to FIG. 4, for example, the illustrated high-level language code 400 may be one example to configure each of the example nodes of the flow control system 200 of FIG. 2. In particular, FIG. 4 depicts one manner in which the communication node 300 of FIG. 3 may be configured to provide a flow control system based on priority associated with traffic flow as described in connection with FIGS. 5 and 6. The example processes 500 and 600 of FIGS. 5 and 6, respectively, may be implemented as machine-accessible instructions utilizing any of many different programming codes stored on any combination of machine-accessible media such as a volatile or nonvolatile memory or other mass storage device (e.g., a floppy disk, a CD, and a DVD). For example, the machine-accessible instructions may be embodied in a machine-accessible medium such as a programmable gate array, an application specific integrated circuit (ASIC), an erasable programmable read only memory (EPROM), a read only memory (ROM), a random access memory (RAM), a magnetic media, an optical media, and/or any other suitable type of medium.

Figure 5:
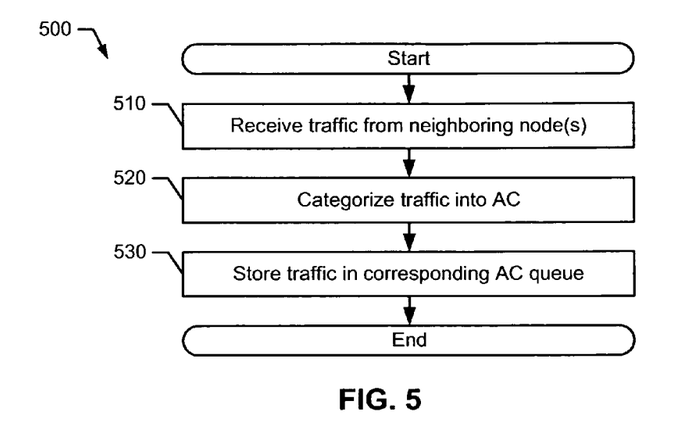
FIG. 5 is a flow diagram representation of one manner in which the example communication node of FIG. 3 may be configured to categorize and store incoming traffic.
Figure 6:
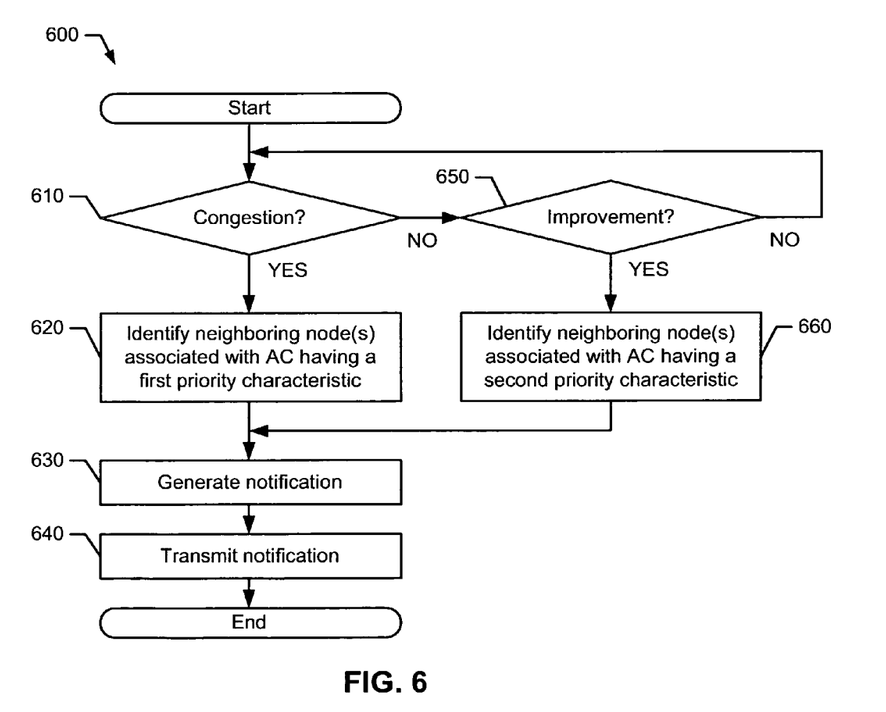
FIG. 6 is a flow diagram representation of one manner in which the example communication node of FIG. 3 may be configured to provide the example flow control system of FIG. 2.

Further, although particular orders of actions are illustrated in FIGS. 5 and 6, these actions may be performed in other temporal sequences. Again, the example process 500 is merely provided and described in conjunction with the communication node 300 of FIG. 3 as an example of one way to configure a communication node to provide a flow control system.

In the example of FIG. 5, the process 500 may begin with the communication node 300 (e.g., via the communication interface 310) receiving traffic from one or more neighboring nodes (block 510). For example, the communication node 300 may be a relay node and receive data from one or more neighboring nodes. The communication node 300 (e.g., via the controller 320) may categorize the traffic into a plurality of ACs (block 520). For example, the communication node 300 may categorize incoming traffic as voice data traffic, video data traffic, best effort data traffic, background data traffic, or other suitable ACs.

Accordingly, the communication node 300 (e.g., via the controller 320) may store the traffic into a corresponding AC queue of the memory 330 (e.g., the VO queue 332, the VI queue 334, the BE queue 336 or the BK queue 338) (block 530). For example, the communication node 300 may store the voice data traffic in the VO queue 332, video data traffic in the VI queue 334, best effort data traffic in the BE queue 336, and background data traffic in the BK queue 338. The methods and apparatus described herein are not limited in this regard.

Turning to FIG. 6, for example, the process 600 may begin with the communication node 300 (e.g., via the traffic flow monitor 340) monitoring a traffic flow condition associated with each traffic flow. As noted above, each traffic flow may be categorized as one of a plurality of ACs. For example, the communication node 300 may monitor voice data traffic, video data traffic, best effort data traffic, background data traffic, and/or other suitable ACs or types of traffic. In particular, the communication node 300 may monitor for a condition indicative of traffic congestion caused by a particular AC at the communication node 300 (e.g., 410 of FIG. 4) (block 610). The communication node 300 may monitor a queue condition associated with a characteristic of an AC queue such as, for example, length of an AC queue, communication rate of the AC queue, and/or other suitable queue characteristics. In one example, the communication node 300 may determine whether the length of an AC queue exceeds a threshold value. If the AC queue length exceeds the threshold value, the communication node 300 may detect a condition indicative of traffic congestion (e.g., a congestion condition).

If the communication node 300 detects a congestion condition at block 610, the communication node 300 may identify one or more neighboring nodes associated with an AC having a first priority characteristic (e.g., 420 and 430 of FIG. 4) (block 620). For example, an AC having a first priority characteristic may be an AC with a priority that is relatively lower than or equal to the priority of the AC that caused/contributed to the congestion condition at the communication node 300. In particular, the communication node 300 may identify one or more neighboring nodes transmitting data of an AC with a priority that is relatively lower than or equal to the priority of the AC that caused/contributed to the congestion condition at the communication node 300 (e.g., 420 of FIG. 4). In one example, if the video data traffic is causing/contributing to the congestion condition, the communication node 300 may identify neighboring nodes that are transmitting video data traffic, best effort data traffic and background data traffic because each of these ACs have a priority that is lower than or equal to the AC that is causing/contributing to the congestion condition. Accordingly, the communication node 300 may generate a notification indicative of the congestion condition (e.g., a congestion notification) (block 630). The communication node 300 may transmit the congestion notification to the neighboring node(s) identified at block 620 (e.g., 440 of FIG. 4) (block 640).

Referring to FIG. 2, for example, if the communication node 250 detects that the traffic flow 294 is the source of the congestion condition at the communication node 250, the communication node 250 may identify the node 230 as a node to notify of the congestion condition (e.g., at block 620 of FIG. 6). Accordingly, the node 250 may generate and transmit the congestion notification to the node 230 (e.g., at the blocks 630 and 640 of FIG. 6) so that the node 230 may reduce the transmission rate of the video data traffic traversing through the node 250 via the traffic flow 294.

In addition to the node 230, the node 250 may also identify the nodes 210 and 220 as nodes to notify of the congestion condition because the nodes 210 and 220 may be associated with the traffic flow 292. As noted above, the traffic flow 294 may include video data traffic, and the traffic flow 292 may include best effort data traffic. Accordingly, the priority of the traffic flow 292 may be lower than or equal to the priority of the traffic flow 294 because best effort data traffic may be a relatively lower priority AC than video data traffic. Thus, the node 250 may also transmit the congestion notification to the nodes 210 and 220 so that the nodes 210 and 220 may reduce the transmission rate of the best effort data traffic traversing through the node 250 via the traffic flow 292.

The node 250, however, may not identify the node 240 as a node to notify of the congestion condition at the node 250. In particular, the node 240 may be associated with the traffic flow 296, which may include voice data traffic. As noted above, the priority of the traffic flow 296 may be relatively higher than the priority of the traffic flow 294 because voice data traffic may be a relatively higher priority AC than video data traffic. Thus, the node 250 may not transmit the congestion notification to the node 240. By maintaining relative priority among the traffic flows 292, 294, and 296, the node 250 may optimize the use of network resources and/or ensure that network resources are properly allocated.

Turning back to block 610 of FIG. 6, if the communication node 300 fails to detect a congestion condition, the communication node 300 may monitor for a condition indicative of traffic improvement at the communication node 300 (e.g., an improvement condition) (block 650). If the communication node 300 fails to detect an improvement condition, controls may return to block 610.

Otherwise if the communication node 300 detects an improvement condition at block 650, the communication node 300 may identify one or more neighboring nodes associated with an AC having a second priority characteristic (e.g., 450 and 460 of FIG. 4) (block 660). For example, an AC having a second priority characteristic may be an AC with a priority that is relatively higher than or equal to the priority of the AC that caused/contributed to the congestion condition at the communication node 300. In particular, the communication node 300 may identify one or more neighboring nodes transmitting data of an AC with a priority relatively higher than or equal to the priority of the AC that caused/contributed to the congestion condition at the communication node 300. In one example, if the video data traffic caused/contributed to the congestion condition, the communication node 300 may identify neighboring nodes that are transmitting video data traffic, and voice data traffic because each of these ACs have a priority that is higher than or equal to the AC that caused/contributed to the congestion condition. Accordingly, the communication node 300 may generate a notification indicative of the improvement condition (e.g., an improvement notification) (block 630). The communication node 300 may transmit the improvement notification to the neighboring node(s) identified at block 660 (e.g., 470 of FIG. 4) (block 640).

Following the above example with reference to FIG. 2, if the node 250 detects an improvement condition, the node 250 may identify the node 230 as a node to notify of the improvement condition (e.g., at block 660 of FIG. 6). Accordingly, the node 250 may generate and transmit the congestion notification to the node 230 (e.g., at the blocks 630 and 640 of FIG. 6) so that the node 230 may increase the transmission rate of the video data traffic traversing through the node 250 via the traffic flow 294.

In addition to the node 230, the node 250 may also identify the node 240 as nodes to notify of the improvement condition because the node 240 may be associated with the traffic flow 296. As noted above, the priority of the traffic flow 296 may be relatively higher than the priority of the traffic flow 294 because voice data traffic may have a relatively higher priority AC than video data traffic. Thus, the node 250 may transmit the improvement notification to the node 240. The node 250, however, may not transmit the improvement notification to the nodes 210 and 220 because the priority of the traffic flow 292 may be relatively lower than or equal to the priority of the traffic flow 294. By maintaining relative priority among the traffic flows 292, 294, and 296, the node 250 may optimize the use of network resources and/or ensure that network resources are properly allocated. The methods and apparatus described herein are not limited in this regard.

While the methods and apparatus disclosed herein are described in FIGS. 5 and 6 to operate in particular manners, the methods and apparatus disclosed herein are readily applicable without certain blocks depicted in FIGS. 5 and/or 6. In addition, while FIGS. 5 and 6 depict particular blocks, the actions performed by some of these blocks may be integrated within a single block or may be implemented using two or more separate blocks.

Further, although the methods and apparatus disclosed herein are described with respect to wireless mesh networks, the methods and apparatus disclosed herein are readily applicable to many other types of wireless communication networks. For example, the methods and apparatus disclosed herein may be applied to WPANs, WLANs, WMANs, WWANs, and/or broadband wireless access (BWA) networks. In one example, the methods and apparatus disclosed herein may be applicable to access points and/or base stations. The methods and apparatus described herein are not limited in this regard.

Figure 7:
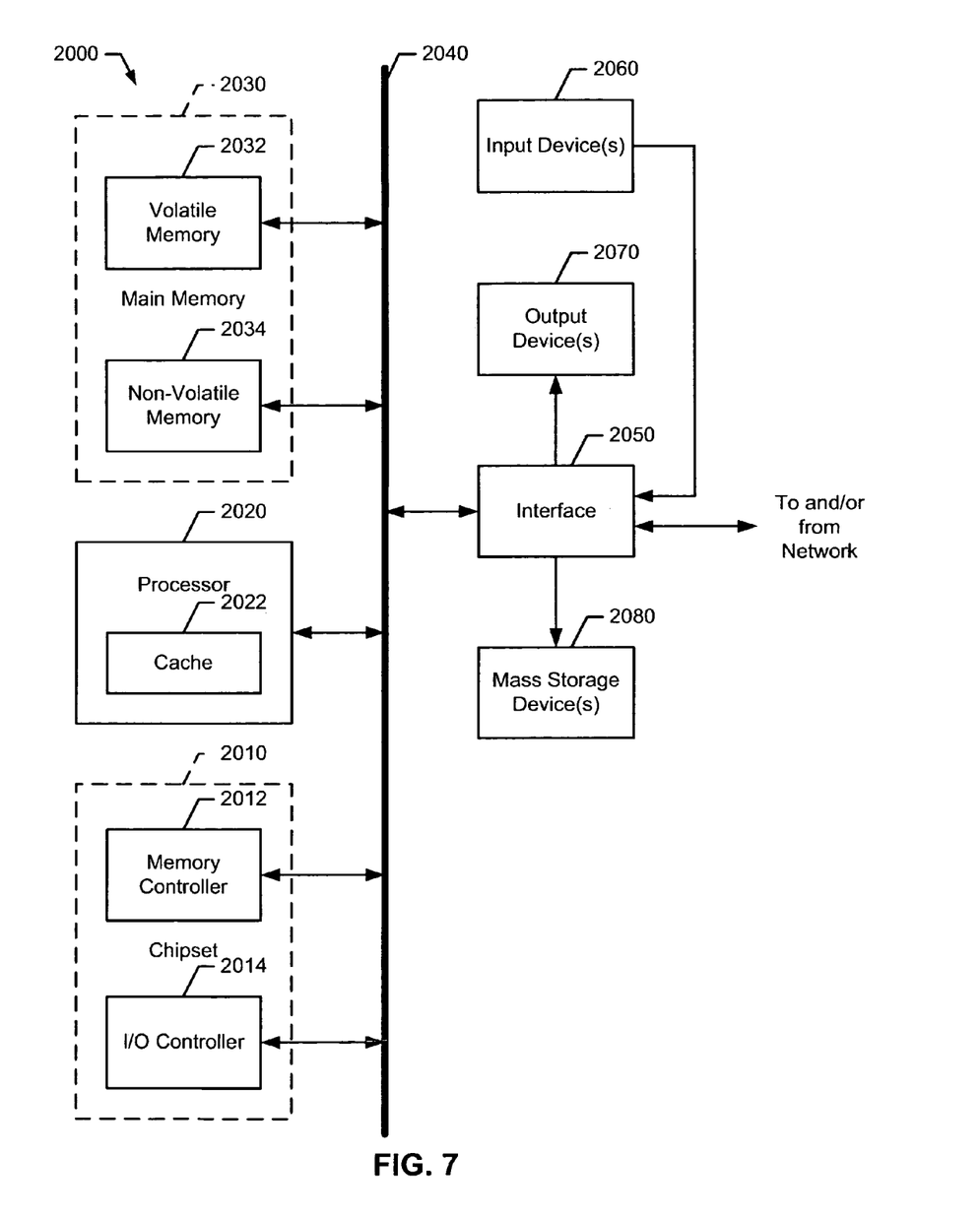
FIG. 7 is a block diagram representation of an example processor system that may be used to implement the example communication node of FIG. 3.

FIG. 7 is a block diagram of an example processor system 2000 adapted to implement the methods and apparatus disclosed herein. The processor system 2000 may be a desktop computer, a laptop computer, a handheld computer, a tablet computer, a PDA, a server, an Internet appliance, and/or any other type of computing device.

The processor system 2000 illustrated in FIG. 7 includes a chipset 2010, which includes a memory controller 2012 and an input/output (I/O) controller 2014. The chipset 2010 may provide memory and I/O management functions as well as a plurality of general purpose and/or special purpose registers, timers, etc. that are accessible or used by a processor 2020. The processor 2020 may be implemented using one or more processors, WLAN components, WMAN components, WWAN components, and/or other suitable processing components. For example, the processor 2020 may be implemented using one or more of the Intel® Pentium® technology, the Intel® Itanium® technology, the Intel® Centrino™ technology, the Intel® Xeon™ technology, and/or the Intel® XScale® technology. In the alternative, other processing technology may be used to implement the processor 2020. The processor 2020 may include a cache 2022, which may be implemented using a first-level unified cache (L1), a second-level unified cache (L2), a third-level unified cache (L3), and/or any other suitable structures to store data.

The memory controller 2012 may perform functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 may also include an interface circuit 2050 that is coupled to the bus 2040. The interface circuit 2050 may be implemented using any type of interface standard such as an Ethernet interface, a universal serial bus (USB), a third generation input/output (3GIO) interface, and/or any other suitable type of interface.

One or more input devices 2060 may be connected to the interface circuit 2050. The input device(s) 2060 permit an individual to enter data and commands into the processor 2020. For example, the input device(s) 2060 may be implemented by a keyboard, a mouse, a touch-sensitive display, a track pad/ball, an isopoint, and/or a voice recognition system.

One or more output devices 2070 may also be connected to the interface circuit 2050. For example, the output device(s) 2070 may be implemented by display devices (e.g., a light emitting display (LED), a liquid crystal display (LCD), a cathode ray tube (CRT) display, a printer and/or speakers). The interface circuit 2050 may include, among other things, a graphics driver card.

The processor system 2000 may also include one or more mass storage devices 2080 to store software and data. Examples of such mass storage device(s) 2080 include floppy disks and drives, hard disk drives, compact disks and drives, and digital versatile disks (DVD) and drives.

The interface circuit 2050 may also include a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network may be controlled by the I/O controller 2014. In particular, the I/O controller 2014 may perform functions that enable the processor 2020 to communicate with the input device(s) 2060, the output device(s) 2070, the mass storage device(s) 2080 and/or the network via the bus 2040 and the interface circuit 2050.

While the components shown in FIG. 7 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

Although certain example methods, apparatus, and articles of manufacture have been described herein, the scope of coverage of this disclosure is not limited thereto. On the contrary, this disclosure covers all methods, apparatus, and articles of manufacture fairly falling within the scope of the appended claims either literally or under the doctrine of equivalents. For example, although the above discloses example systems including, among other components, software or firmware executed on hardware, it should be noted that such systems are merely illustrative and should not be considered as limiting. In particular, it is contemplated that any or all of the disclosed hardware, software, and/or firmware components could be embodied exclusively in hardware, exclusively in software, exclusively in firmware or in some combination of hardware, software, and/or firmware.

What is claimed is:

1. A method comprising:
    monitoring, at a first node of a plurality of communication nodes, a traffic flow condition associated with a first traffic flow between the first node and a second node, the first traffic flow having a first access category, the first access category being associated with a plurality of access categories and having a first priority characteristic to access a communication resource of the plurality of communication nodes;
    first determining at the first node, in response to said monitoring, a congestion in the first traffic flow between the first node and the second node;
    generating, at the first node, a first notification for a third node based at least in part on the first priority characteristic, a second priority characteristic and said first determining, the third node being associated with a second traffic flow between the first node and the third node, the second traffic flow having a second access category, and the second access category having the second priority characteristic to access the communication resource, wherein the first notification is generated to instruct the third node to reduce the second traffic flow by reducing a transmission rate of data at the third node;
    second determining at the first node, in response to said monitoring, an improvement in the first traffic flow; and
    generating at the first node, a second notification for a fourth node based at least in part on the first priority characteristic, a third priority characteristic and said second determining, the fourth node being associated with a third traffic flow between the first node and the fourth node, the third traffic flow having a third access category, and the third access category having the third priority characteristic to access the communication resource;
    wherein the second notification is generated to instruct the fourth node to increase the third traffic flow by increasing the transmission rate of data at the fourth node in response to detecting that the priority of the third access category is relatively higher than or equal to the priority of the first access category.

2. A method as defined in claim 1, wherein monitoring the traffic flow condition comprises monitoring for at least one of a condition indicative of traffic congestion or a condition indicative of traffic improvement at the first node.

3. A method as defined in claim 1, wherein monitoring the traffic flow condition comprises monitoring a queue condition associated with an access category queue, the access category queue storing data of the first access category at the first node.

4. A method as defined in claim 1, wherein the third node and fourth node are two of a contributory node, a peer node, a lower-priority access category node, a higher-priority access category node or a bystander node.

5. A method as defined in claim 1, wherein generating the first notification comprises generating a congestion notification based on at least one of arbitration inter-frame spacing numbers, minimum contention windows, maximum contention windows, or transmission opportunities associated with the first and second access categories.

6. A method as defined in claim 1 further comprising identifying the third node as a recipient node of the first notification in response to detecting that the priority of the second access category is relatively lower than or equal to the priority of the first access category.

7. A method as defined in claim 1 further comprising categorizing traffic flows at the first node as one of a plurality of access categories, wherein the plurality of access categories comprise at least one of a voice data traffic, a video data traffic, a best effort data traffic, or a background data traffic.

8. A method as defined in claim 1 further comprising storing data of traffic flows at the first node into one of a plurality of access category queues, each of the plurality of access category queues corresponding to one of the plurality of access categories at the first node.

9. A method as defined in claim 1 further comprising transmitting the notification from the first node to the third node, wherein the plurality of communication nodes are associated with a wireless mesh network.

10. An article of manufacture comprising a computer readable storage medium including computer executable instructions, which when accessed, causes a machine to:

monitor a traffic flow condition associated with a first traffic flow between a first node and a second node, the first traffic flow having a first access category, the first access category being associated with a plurality of access categories and having a first priority characteristic to access a communication resource of the plurality of communication nodes;

first determine, in response to said monitoring, a congestion in the first traffic flow between the first node and the second node; and generate a first notification for a third node based at least in part on the first priority characteristic, a second priority characteristic, and said first determining the congestion, the third node being associated with a second traffic flow between the first node and the third node, the second traffic flow having a second access category and the second access category having the second priority characteristic to access the communication resource, wherein the first notification is generated to instruct the third node to reduce the second traffic flow by reducing a transmission rate of data at the third node;

second determine in response to said monitoring, an improvement in the first traffic flow between the first node and a second node;

generate at the first node, a second notification for a fourth node based at least in part on the first priority characteristic, a third priority characteristic and said second determining, the fourth node being associated with a third traffic flow between the first node and the fourth node, the third traffic flow having a third access category, and the third access category having the third priority characteristic to access the communication resource;

wherein the second notification is generated to instruct the fourth node to increase the third traffic flow by increasing the transmission rate of data at the fourth node in response to detecting that the priority of the third access category is relatively higher than or equal to the priority of the first access category.

11. An article of manufacture as defined in claim 10, wherein the instructions, when accessed, causes the machine to monitor the traffic flow condition by monitoring for at least one of a condition indicative of traffic congestion or a condition indicative of traffic improvement at the first node.

12. An article of manufacture as defined in claim 10, wherein the instructions, when accessed, causes the machine to monitor the traffic flow condition by monitoring a queue condition associated with an access category queue, the access category queue storing data of the first access category at the first node.

13. An article of manufacture as defined in claim 10, the third node being one of a contributory node, a peer node, a lower-priority access category node, a higher-priority access category node or a bystander node.

14. An article of manufacture as defined in claim 10, wherein the instructions, when accessed, causes the machine to identify the third node as a recipient node of the first notification in response to detecting that the priority of the second access category is relatively lower than or equal to the priority of the first access category.

15. An article of manufacture as defined in claim 10, wherein the instructions, when accessed, causes the machine to categorize traffic flows at the first node as one of a plurality of access categories, wherein the plurality of access categories comprise at least one of a voice data traffic, a video data traffic, a best effort data traffic, or a background data traffic.

16. An article of manufacture as defined in claim 10, wherein the instructions, when accessed, causes the machine to store data of traffic flows at the first node into one of a plurality of access category queues, each of the plurality of access category queues corresponding to one of the plurality of access categories at the first node.

17. An apparatus comprising:

a traffic flow monitor operatively coupled to the memory to monitor a traffic flow condition associated with a first traffic flow of a first access category at a first node of a plurality of communication nodes and to determine a congestion in the first traffic flow, the first traffic flow being between the first node and a second node, the first traffic flow being between the first node and a second node, the first access category being associated with the plurality of access categories and having a first priority characteristic to access a communication resource of the plurality of communication nodes; and a notification generator operatively coupled to the traffic flow monitor to generate a congestion notification indicative of the traffic flow condition for a third node based at least in part on the first priority characteristic, a second priority characteristic, and said determining the congestion, the third node being associated with a second traffic flow of a second access category and occurring between the first node and the third node, and the second access category having the second priority characteristic to access the communication resource;

wherein the congestion notification is generated to instruct the third node to reduce the second traffic flow by reducing a transmission rate of data at the third node;

wherein the traffic flow monitor is further configured to determine an improvement in the first traffic flow;

wherein the notification generator is further configured to generate an improvement notification based at least in part on the first priority characteristic, a third priority characteristic, and said determining the improvement in the first traffic flow, wherein the improvement notification is generated to instruct a fourth node to increase a third traffic flow between the first node and the fourth node, by increasing the transmission rate of data at the fourth node, wherein the third traffic flow has a third access category, and the third access category has the third priority characteristic to access the communication resource;

wherein the apparatus further comprises:

a node identifier to identifying the fourth node as a recipient node of the improvement notification in response to detecting that the priority of the third access category is relatively higher than or equal to the priority of the first access category.

18. An apparatus as defined in claim 17, wherein the traffic flow comprises at least one of a condition indicative of traffic congestion or a condition indicative of traffic improvement at the first node.

19. An apparatus as defined in claim 17, wherein the third node comprises one of a contributory node, a peer node, a lower-priority access category node, a higher-priority access category node or a bystander node.

20. An apparatus as defined in claim 17 further comprising a node identifier to identify the third node as a recipient node of the congestion notification in response to detecting that the priority of the second access category is relatively lower than or equal to the priority of the first access category.

21. An apparatus as defined in claim 17 further comprising a memory having a plurality of access category queues, each of the plurality of access category queues corresponding to one of the plurality of access categories.

22. A method comprising:
supporting, at a first node, one or more communication flows of a first access category, said supporting including queuing communications from the one or more communication flows in a queue dedicated to the first access category;
supporting, at the first node, one or more communication flows of a second access category, which has a relative priority less than the first access category,
first determining, at the first node, a congestion event at the queue;
transmitting, from the first node, in response to said first determining, a congestion notification to each of one or more nodes associated with the one or more communication flows of the second access category to instruct the one or more nodes associated with the one or more communication flows of the second access category to reduce transmission rates of the one or more communication flows of the second access category;
supporting, at the first node, one or more communication flows of a third access category, which has a relative priority higher than the first access category,
second determining, at the first node, a congestion improvement event at the queue;
transmitting, from the first node, in response to said second determining, a congestion improvement notification to each of one or more nodes associated with the one or more communication flows of the third access category to instruct the one or more nodes associated with the one or more communication flows of the third access category to increase transmission rates of the one or more communication flows of the third access category.

23. The method of claim 22, further comprising:
transmitting, from the first node, in response to said first determining, a congestion notification to each of one or more nodes associated with the one or more communication flows of the first access category to instruct the one or more nodes associated with the one or more communication flows of the first access category to reduce transmission rates of the one or more communication flows of the first access category.

24. The method of claim 22, further comprising:
supporting, at the first node, one or more communication flows of a third access category, which has a relative priority higher than the first access category,
second determining, at the first node, a congestion improvement event at the queue;
transmitting, from the first node, in response to said second determining, a congestion improvement notification to each of one or more nodes associated with the one or more communication flows of the third access category to instruct the one or more nodes associated with the one or more communication flows of the third access category to increase transmission rates of the one or more communication flows of the third access category.

* * * * *

UNITED STATES PATENT AND TRADEMARK OFFICE
CERTIFICATE OF CORRECTION

| | |
|---|---|
| PATENT NO. | : 7,623,459 B2 |
| APPLICATION NO. | : 11/292773 |
| DATED | : November 24, 2009 |
| INVENTOR(S) | : Yang et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 824 days.

Signed and Sealed this

Twenty-sixth Day of October, 2010

David J. Kappos
*Director of the United States Patent and Trademark Office*